Dec. 3, 1957 L. N. MERTZ 2,815,452
INTERFEROMETER
Filed Nov. 12, 1954 2 Sheets-Sheet 1

Inventor:
Lawrence N. Mertz,
by M. V. Hamilton
Attorney

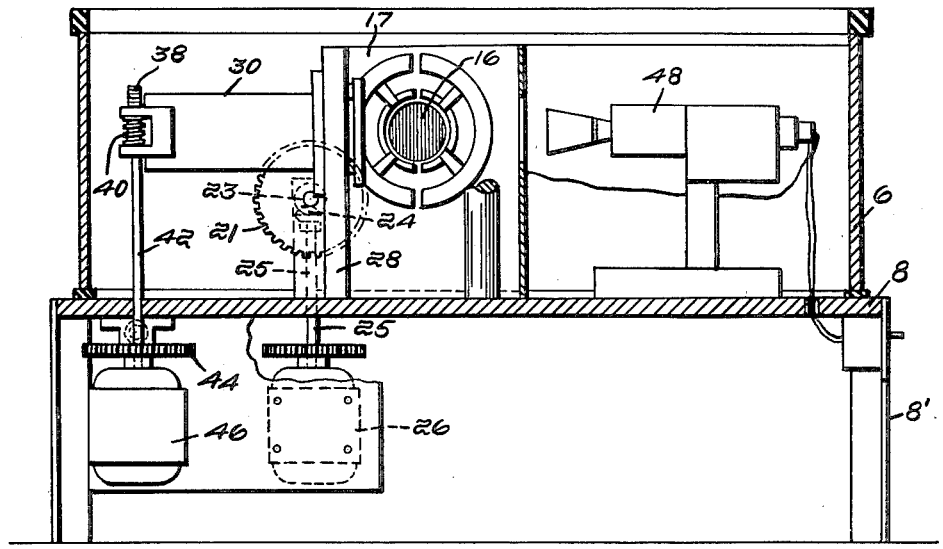
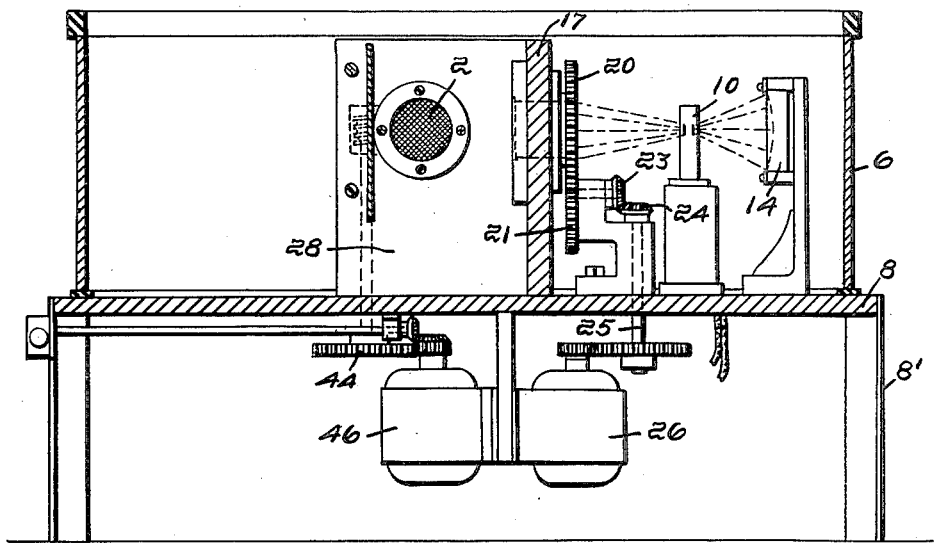

United States Patent Office 2,815,452
Patented Dec. 3, 1957

2,815,452

INTERFEROMETER

Lawrence N. Mertz, Cambridge, Mass., assignor to Baird Associates, Inc., Cambridge, Mass., a corporation of Massachusetts Application November 12, 1954, Serial No. 468,378

6 Claims. (Cl. 250—83.3)

This invention relates to optical filters and optical filter techniques for observing and evaluating far infra-red radiation in the region exemplified by a wavelength range of from 100–1000 microns.

In certain instances, it may be desirable to obtain information available from examination and study of far infra-red radiation in the spectral region indicated. However, it is extremely difficult to deal with such far infra-red radiations because of the scarcity of energy in these indications and very little is known in connection with them.

It is an object of this invention to deal with the problem indicated and to devise and construct optical filters for far infra-red radiations, particularly in the wavelength range of 100–1000 microns. It is also the purpose of the invention to devise a filter apparatus for use in a spectrometer type of optical system.

The nature of the invention and its objects will be more fully understood and appreciated from the following description of a preferred embodiment of the invention selected for purposes of illustration and shown in the accompanying drawings, in which Fig. 1 is a plan view;

Fig. 2 is a cross-section taken on the line 2—2 of Fig. 1;

Fig. 3 is a cross-section taken on the line 3—3 of Fig. 1; and

In accordance with the invention, I have devised an optical filter which may be referred to as a polarization-type interferometer for the far infra-red and in which I employ a plurality of wire gratings. These gratings are arranged to act as polarizing beam splitters for radiation wavelengths longer than about three times the spacing of the grating wires and, for such radiations, the gratings reflect that radiation component which is polarized parallel to the wires while transmitting radiation components polarized perpendicular to the grating wires.

Figure 4:
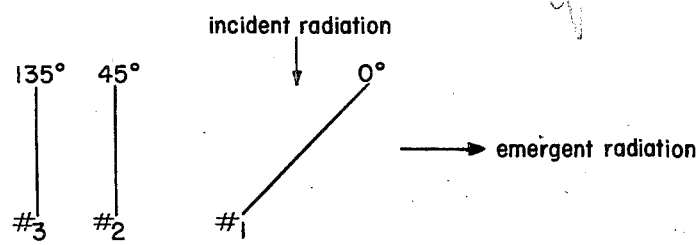
Fig. 4 is a diagrammatic view illustrating a preferred form of filter arrangement of the invention.

In Fig. 4, there is illustrated a simple form of interferometer of the invention in which three gratings are employed. The orientation of the wires in the grating is referred to as the horizontal plane of the paper. Grating 1 is arranged to act as a polarizer and analyzer while gratings 2 and 3 are arranged to act as a reflector type variable retardation system. Incident radiation from a source indicated by arrow 4 is acted on by the polarizer 1.

The horizontally polarized component of the incident radiation is reflected to the left. This consists of two equal, linearly polarized coherent components. These components are polarized at 45° and 135° to the horizontal. One is reflected by grating No. 2 and the other is transmitted by grating No. 2 to be reflected by grating No. 3. This introduces a path difference, or retardation of twice the separation of No. 2 and No. 3, between the components as well as reflecting them both back toward grating No. 1. The separation of No. 2 and No. 3 is made variable by mounting No. 3 on a piston arrangement. Grating No. 1 now acts as an analyzer which transmits vertically polarized radiation, and the system is equivalent to a variable retardation plate between crossed polarizers. A mirror may be used as grating No. 3, but for imperfect polarizers this is preferably a grating.

Figure 1:
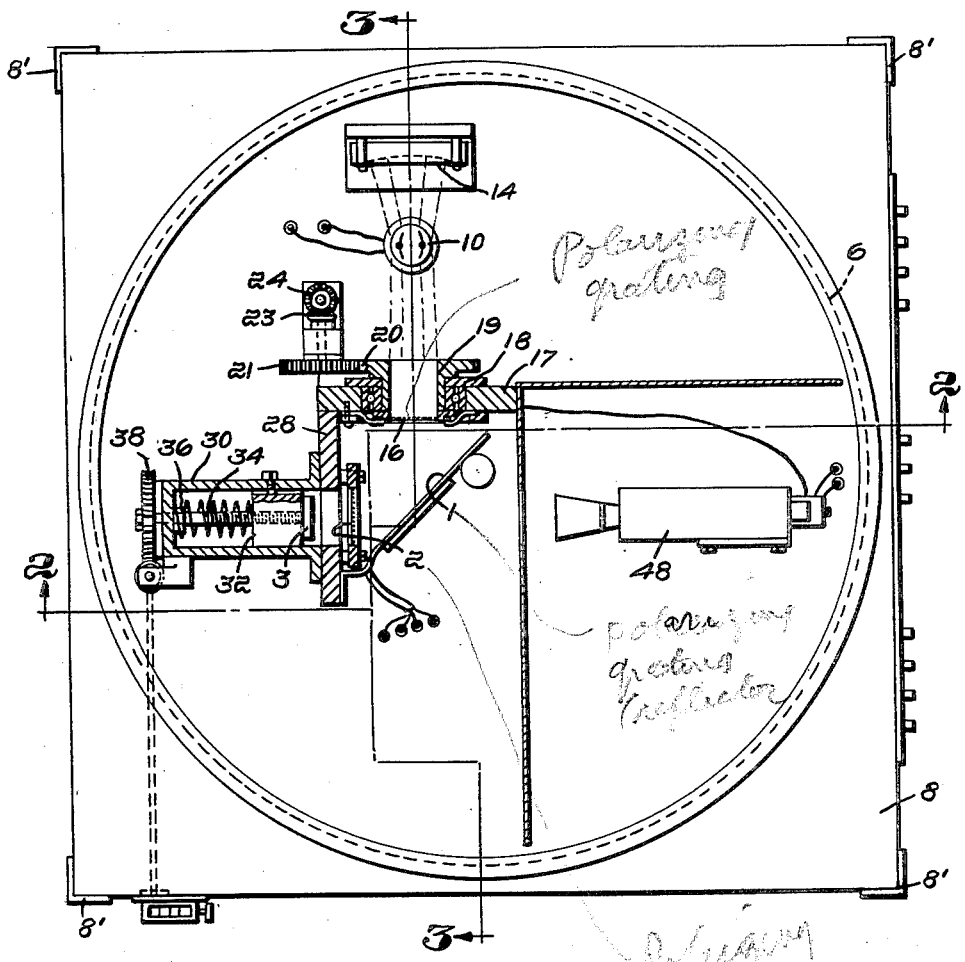

As illustrative of one preferred form of apparatus in which the interferometer of the invention may be embodied, I have devised an interferometer arrangement indicated in detail in Figs. 1, 2 and 3. In this form of apparatus, the interferometer is employed to filter radiation in the far infra-red in a manner suitable for multichannel spectrometry.

In the structure shown in Figs. 1, 2 and 3, numeral 6 denotes a cylindrical enclosure mounted on a base 8 in turn received on uprights 8'. In the enclosure is supported a radiation source 10 which may, for example, consist of a mercury lamp provided wtih suitable electrical connections 12. A mirror 14 may also be employed to reflect radiations from the source 10.

Located in front of the source 10 is a light chopping device consisting of a grating polarizing element 16 and means for mechanically rotating this element. Included in the mechanical means referred to is a bearing support 17 in which are bearings 18 carrying a tube or cylinder 19 to which the optical element 16 is attached. At its opposite end, the tube 19 is provided with a gear 20 meshing with a gear 21 fast on a shaft 22. Also mounted on shaft 22 is a bevel gear 23 driving another bevel gear 24 on a shaft 25. This shaft is driven through conventional gearing by a motor 26.

As shown in Fig. 1, a stationary grating 1 is located in front of the rotatable optical element 16 in an angularly disposed position, as noted. Rigidly secured to the base 8 is a vertical wall 28 in which is mounted a second grating element 2. At the opposite side of the partition 28 is supported a cylindrical housing 30 in which is mounted a piston 32 having a threaded end 34 which is mounted for rotation in a bar 36 so that turning the threaded end 34 operates to move the piston 32 along the cylindrical housing. At the right-hand side of the piston 32, as shown in Fig. 1, is a third grating 3 lying in spaced relation to the grating 2, as shown.

The shaft 34 has fixed to the outer end thereof a gear 38 which, as best shown in Fig. 2, is driven by a worm 40 and shaft 42 through a gear train 44 and motor 46, the latter members being mounted preferably at a point below the base 8. By driving the motor 46 and the connected gear train, the piston 32 may be caused to travel toward and away from the fixed grating 2 and there is thus produced a variable retardation system by means of which the two gratings are spaced at different distances from one another, as desired. Radiations from the source 10 are received by this polarizer grating system in the manner described above and are directed against a radiation detector element 48, shown at the right-hand side of Fig. 1. This radiation detector element may, for example, consist of a pneumatic infrared detector of the type known as a Golay detector.

It is intended that the invention may be practiced in certain modified forms within the scope of the appended claims.

I claim:

1. A new type interferometer comprising a plurality of wire grating polarizers for operating in the far infra-red, said gratings being supported and arranged so that at least one of the gratings acts as a polarizer and analyzer while the remaining gratings act as a reflection type variable retardation system.

2. A new type interferometer comprising three wire gratings, one of said gratings supported in an angularly disposed position to receive radiations, the remaining two wire gratings being arranged at one side of the said first grating in spaced-apart relation to one another and to the said first grating, and means for detecting radiations passed through the said wire grating members.

3. A structure as defined in claim 1, including means for mechanically varying the spacing of those gratings which act as a variable retardation system.

4. A structure as defined in claim 1, including means for mechanically varying those gratings which act as a variable retardation system and means consisting of an infra-red detector supported in close proximity to the gratings.

5. A new type interferometer comprising an enclosure, a plurality of wire grating polarizers mounted in the enclosure, said gratings being supported and arranged so that at least one of the gratings acts as a polarizer and analyzer and the remaining gratings act as a reflection type variable retardation system, a radiation source mounted in the enclosure at one side of the polarizer and analyzer grating and an infra-red detector located within the enclosure along an axis passing through the central axis of the said gratings which act as a retardation system.

6. A structure as defined in claim 5, including a light chopping device consisting of a wire polarizer and means for rotating the wire polarizer.

References Cited in the file of this patent

UNITED STATES PATENTS

| | | |
|---|---|---|
| 908,725 | Ashley | Jan. 5, 1909 |
| 1,455,795 | Logan | May 22, 1923 |
| 2,224,214 | Brown | Dec. 10, 1940 |
| 2,650,307 | Koppius | Aug. 25, 1953 |